United States Patent [19]

Roze et al.

[11] Patent Number: 4,868,010
[45] Date of Patent: Sep. 19, 1989

[54] METHOD FOR OVERCOMING AGING OF A MAGNETOOPTICAL RECORDING MEDIUM

[75] Inventors: Danielle Roze, Villiers Saint Frederic; Marie-Monique Coirre, Bois-D'Arcy; Francois Rio, Montigny Le Bretonneux; Pierre Bernstein, Neauphle-Le-Chateau, all of France

[73] Assignee: Bull S.A., Paris, France

[21] Appl. No.: 204,293

[22] Filed: Jun. 9, 1988

Related U.S. Application Data

[63] Continuation of Ser. No. 71,472, Jul. 9, 1987, abandoned.

[30] Foreign Application Priority Data

Jul. 11, 1986 [FR] France ................................ 86 10211

[51] Int. Cl.$^4$ ............................................. B05D 5/12
[52] U.S. Cl. .................................... 427/130; 427/131; 427/132; 427/162; 427/250; 427/255.1; 427/255.7; 427/294
[58] Field of Search .............................. 427/127-132, 427/48, 162, 250, 255.1, 255.7, 294; 428/700, 694

[56] References Cited

U.S. PATENT DOCUMENTS 4,478,872 10/1984 Pulliam .......................... 427/130 X
4,666,789  5/1987 Gueugnon et al. ............. 428/694 X

FOREIGN PATENT DOCUMENTS 0157664  9/1985  European Pat. Off. .

OTHER PUBLICATIONS

IEEE Transactions on Magnetics, vol. MAG-17, No. 6, D. F. Shen et al., "Effect of Annealing on the Compensation Temperature of RE-TM Amorphous Films", Nov. 1981, pp. 2704–2706.
Journal of Applied Physics, vol. 57, No. 8, Part 2B, M. K. Bhattacharyya et al., "Finite-Element Modeling of Laser Beam Heating of Magnetic Films", Apr. 15, 1985, pp. 3894–3896.

Primary Examiner—Bernard Pianalto
Attorney, Agent, or Firm—Kerkam, Stowell, Kondracki & Clarke

[57] ABSTRACT

A method for overcoming aging of a magnetooptical recording medium (MEMOI) including at least one magnetic layer (CMI) covered by a layer of alumina (DIELI$_2$) that is transparent to light. In order to improve the resistance to magnetic aging of the magnetooptical recording medium (MEMOI), this medium is subjected to annealing at a temperature in the vicinity of 200° C., immediately after the medium is being deposited in a vacuum at ambient temperature. The invention is applicable to magnetooptical disk memories.

2 Claims, 2 Drawing Sheets

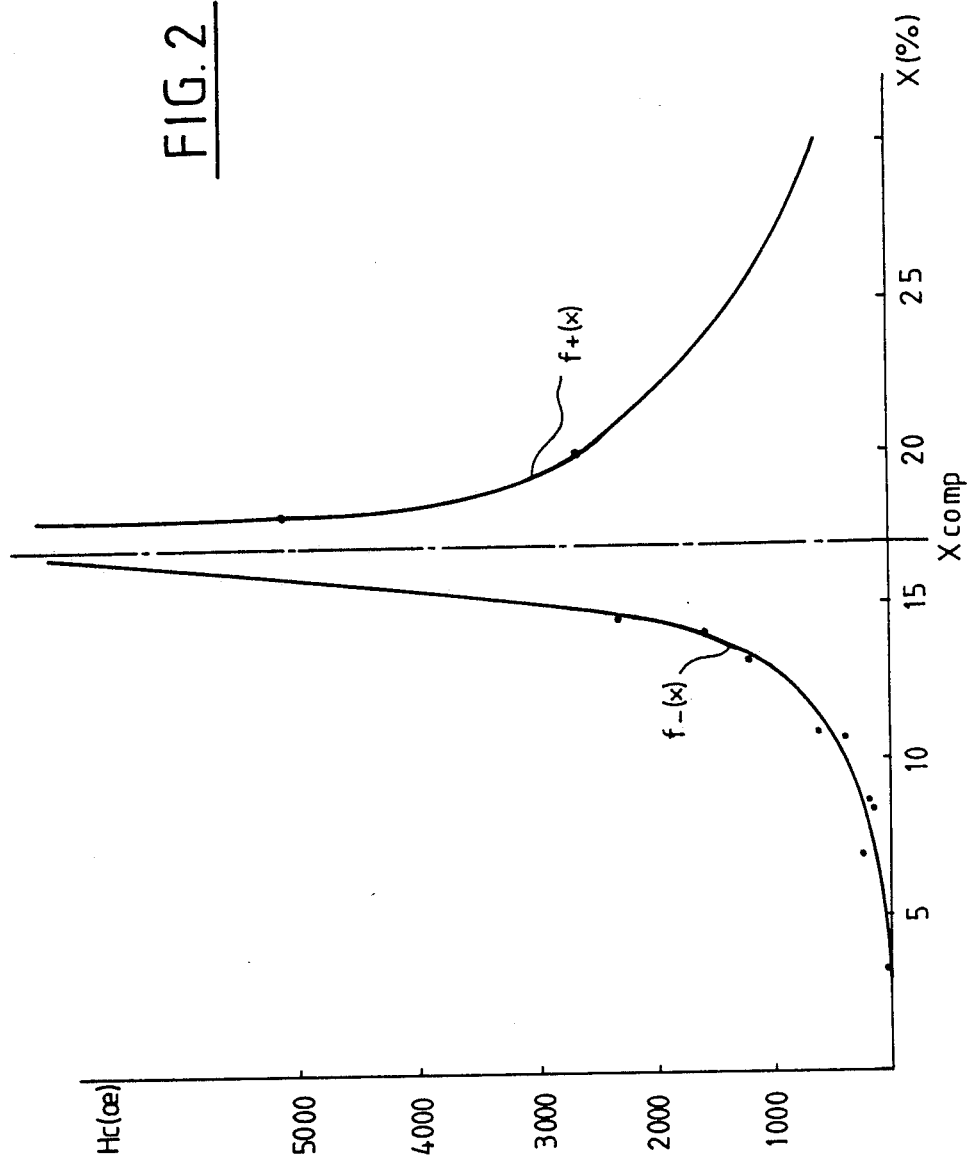

METHOD FOR OVERCOMING AGING OF A MAGNETOOPTICAL RECORDING MEDIUM

This is a continuation of application Ser. No. 071,472, filed July 9, 1987, now abandoned.

FIELD OF THE INVENTION

The present invention relates to a method for overcoming aging of a magnetooptical recording medium. More particularly, it relates to magnetooptical disk memories.

BACKGROUND OF THE INVENTION

Magnetooptical disk memories are known to be memories in which the data are carried by magnetic disks and ready by opto-electronic devices. These disk memories are highly important solutions, since they enable attaining radial and longitudinal densities on the order of 10,000 tracks per centimeter and 10,000 data per centimeter, respectively. (Radial density is the number of data per unit of length measured along the diameter of the disk, while longitudinal density is the number of data per unit of length measured along the circumference of a track.)

In magnetooptical memories, one often-used mode of writing data is the "thermo-magnetic" mode, which comprises combining the thermal action due to the impact of a laser beam on the recording surface of the magnetic disk, and the application of a magnetic field to the vicinity of the impact. A discussion of the "thermo-magnetic" mode is found in U.S. Pat. No. 4,510,544. In the vicinity of the laser beam impact, the heating of the magnetic medium is on the order of several tens of degrees and may even exceed a hundred degrees.

The mode of operation of magnetooptical disk memories is based on the magnetooptic effect, which is characteristic of certain magnetic materials, in particular the alloys including a metal of the first series of transitions, e.g. Fe, Co, Vn, Cr, Mn and one of the metals of the heavy rare earths group, such as terbium or gadolinium or dysprosium.

The magnetooptic effect of these magnetic materials has to do with the interaction of a rectilinear polarized light with the magnetic state of the material. This interaction may occur by transmission of the light through the material, and then the magnetooptic effect is known as the Faraday effect. It may also occur by reflection onto the magnetooptical recording medium; in that case, the magnetooptic effect is known as the Kerr effect.

The interaction of a rectilinear polarized light with the magnetic state of the magnetic recording material of a magnetooptical memory causes the electrical field vector to rotate in the plane perpendicular to the direction of propagation of the light. The direction of this rotation is a function of this magnetic state (defined in particular by the direction of magnetization in the material in the vicinity where it receives the rectilinear polarized light). To read the data recorded on a magnetic medium for magnetooptical recording, it is accordingly sufficient to detect the direction of rotation of the electrical field vector.

The manner in which the data in a magnetooptical memory can be read is discussed in further detail in the aforementioned U.S. Pat. No. 4,510,544.

Magnetic recording media having properties such that the signal-to-noise ratio of the optoelectronic reading device associated with this medium is high are known. Such media are described, for example, in the article by G. A. N. Connel, R. Allen and M. Mansuripur of the Xerox Corporation Research Center in Palo Alto, California, entitled "Interference enhanced Kerr spectroscopy for very thin absorbing films—applications to amorphous terbium iron", published in the Journal of Magnetism of Magnetic Materials, No. 35, 1983, by the North Holland Publishing Company.

One such medium having magnetooptical properties is multilayered. It includes, in succession, a reflecting layer, typically metallic, disposed on a substrate; a first dielectric layer; a layer of magnetic material having magnetooptical properties, specifically an alloy preferably including iron or cobalt and a heavy rare earth, such as terbium or gadolinium; and a second dielectric layer. The mode of operation of a multilayered medium such as this is discussed in U.S. Pat. No. 4,666,789.

It will be recalled that the thickness of the layers of such a medium is on the order of several tens to several hundred Angströms and may even attain one or two thousand Angströms, and that the magnetic layer is anisotropic, with its axis of easy magnetization being perpendicular to its surface. In the aforementioned U.S. Pat. No. 4,666,789, it is indicated that such magnetic recording media have one major disadvantage, namely that their magnetic properties do not remain constant over time. In particular, depending on whether the initial content X of rare earth in the iron/rare earth alloy comprising the magnetooptical layer is less than or greater than a predetermined value for to each alloy, known as the compensation composition $X_{comp}$, it is observed that:

if $X < X_{comp}$, the coercive field $H_c$ of the magnetic recording medium decreases with time, while if $X > X_{comp}$, it is observed that the coercive field $H_c$ increases with time, and then decreases once the composition X has become less than $X_{comp}$.

This phenomenon is a hindrance, because the coercive field of the magnetic recording medium must remain between certain limits, for example between 500 and 1000 Oerstads.

For the sake of simplification, this deterioration in the magnetic properties of the multilayered recording medium over time will hereinafter be called aging of the recording medium.

The aforementioned U.S. Pat. No. 4,666,789 describes and claims solutions for overcoming this disadvantage.

One of the solutions adopted comprises using a dielectric layer made of alumina and having a thickness that must be greater than 600 Angströms, for protecting the medium. It has been possible to determine that over a period of time equal to 1000 hours, the magnetic properties of such a medium, covererd with an alumina dielectric layer, remain satisfactory at ambient temperature.

Nevertheless, it has been found that the resistance to aging of this medium deteriorates when temperatures higher than ambient temperature are used, and the extent of deterioration increases, the higher the temperature used. In other words, the higher the temperature at which the medium is used, the more the magnetic properties of the medium deteriorate.

This is an extreme hindrance when the thermo-magnetic writing mode is used.

OBJECT AND SUMMARY OF THE INVENTION

The present invention makes it possible to overcome this disadvantage by considerably reinforcing the resistance to aging of magnetooptical media based on transition metal/rare earths and covered by an alumina layer, regardless of the temperature at which these media are used.

According to the invention, the method for overcoming aging of a magnetooptical recording medium including at least one magnetic layer formed by an alloy including a metal of the group of rare earths and a metal of the group of the first transition series covered by a layer of alumina, $Al_2O_3$, is characterized in that in order to improve the resistance to magnetic aging of the magnetooptical recording medium, this medium, after being deposited in a vacuum at ambient temperature, is subjected to annealing.

Preferably this annealing is performed at a temperature on the order of 200° C., for a period of one-half hour.

Further characteristics and advantages of the present invention will become apparent from the ensuing description, given by way of non-limiting example, in conjunction with the accompanying drawings.

BRIEF DESCRIPTION OF THE DRAWINGS

FIG. 2 is a curve representing the variation of the coercive field of a magnetic recording medium according to the prior art such as is shown in FIG. 1, for a given thickness of the magnetic layer involved in its composition, as a function of the rare earth content in the alloy constituting the magnetic layer of the magnetooptical recording medium.

DESCRIPTION OF THE PREFERRED EMBODIMENT

Figure 1:
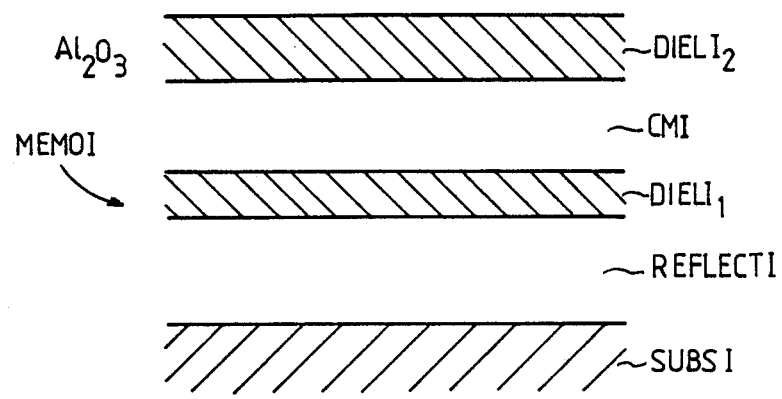
FIG. 1 shows a multilayered magnetic recording medium such as that described in the aforementioned U.S. Pat. No. 4,666,789.

FIG. 1 is a sectional view of a recording medium of the kind described in the aforementioned U.S. Pat. No. 4,666,789, to which the method according to the invention is applicable.

A magnetooptical recording medium of this kind includes the following:

a substrate SUBSI, preferably of non-magnetic insulating material;

a light-reflecting layer REFLECTI, preferably made of a metallic material, such as aluminum;

a first dielectric layer $DIELI_1$;

a magnetic layer CMI having magnetooptical properties, preferably made of an alloy of iron or cobalt and a metal of the heavy rear earths group, such as terbium or gadolinium; and a second dielectric layer $DIELI_2$, preferably made of the same material as the first dielectric layer $DIELI_1$.

The thickness of the first dielectric layer is between 200 and 1500 Angströms, while the thickness of the second dielectric layer is greater than 600 Angströms. These two dielectric layers are made of alumina, $Al_2O_3$, for example.

The magnetooptical medium described above, referring to FIG. 1, comprises an interferential optical system the mode of operation of which is described in the aforementioned article by G. A. N. Connel et al., for example.

The ensuing description refers to FIG. 2, which shows the curve of variation of the coercive field $H_c$ as a function of the composition of the alloy comprising the magnetic layer CMI. This curve is plotted for a thickness of the magnetic layer equal to 2000 Angströms and has been shown immediately after the manufacture of the magnetooptical recording medium MEMOI.

The coercive field measured is the coercive field known as the magnetooptical field, which is obtained as described in U.S. Pat. No. 4,666,789.

It is seen that the curve $H_c = f(X)$ can be broken down into two curves, that is, $f_{-(X)}$ and $f_{+(X)}$.

The first curve, $f_{-(X)}$, is obtained for the values of X less than a composition, known as the compensation composition $X_{comp}$, for which the magnetooptical coercive field $H_c$ has a very high value, one that is impossible to measure practically. It is apparent that the curve $f_{-(X)}$ is a curve that increases as a function of X.

Conversely, the curve $f_{+(X)}$ obtained for the values of X greater than $X_{comp}$ decreases as a function of X.

In present practice, the composition of the alloy of iron and rare earth that comprises the magnetic layer is different from the compensation composition, being either less than or greater than the latter.

The phenomenon of aging of a magnetooptical layer of iron and rare earth of the type shown in FIG. 1 is expressed as a decrease in the coercive field, if X is less than $X_{comp}$, and an increase followed by a decrease, if X is greater than $X_{comp}$. In these two cases, this is due to a decrease in the rare earth content of the magnetic layer CMI.

Figure 3:
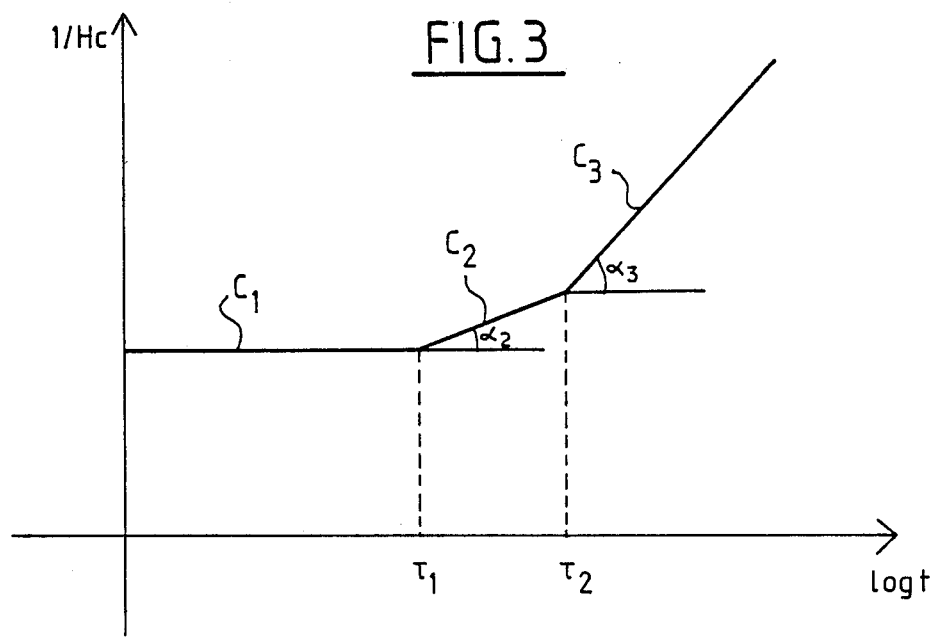
FIG. 3 shows how the characteristics that define aging of a magnetooptical recording medium such as that shown in FIG. 1 can be determined.

In practice, the aging of a magnetooptical layer is preferably measured as follows:

The curve of variation of the inverse of the coercive field, $1/H_c$, is plotted as a function of the logarithm of the time, log t. One such curve is shown in FIG. 3, corresponding to a recording medium for which $X < X_{comp}$. It includes three segments $C_1$, $C_2$, $C_3$. Segment $C_1$ is a stage where the quantity $1/H_c$ remains constant as a function of the time from the initial instant $t=0$ until the instant $\tau_1$.

The curve $C_2$ is a straight line with a positive slope showing that the quantity $1/H_c$ increases as a function of time, from the instant $\tau_1$ until the instant $\tau_2$; the slope of this curve $c_2$ is $\alpha_2$.

The curve $C_3$ is a curve having a positive slope $\alpha_3$, showing that $1/H_c$ increases rapidly as a function of time (and consequently, that $H_c$ decreases rapidly as a function of time) beginning at the instant $\tau 2$. At each point of the curve, the slope $\alpha_3$ is very much greater than the slope $\alpha_2$.

To measure aging, either the time $\tau_1$ or the time $\tau_2$, which are known as characteristic times, is used. These characteristic times are a function of the temperature T of use of the medium.

$\tau_1$ and/or $\tau_2$ should suitably then be determined for each of the curves $1/H_c$ as a function of log t, obtained for a given temperature T. In the ensuing discussion, $\tau_1$ (T) and $\tau_2$ (T) will be used to represent the functions that yield the evolutions of the characteristic times $\tau_1$ and $\tau_2$, respectively, as a function of the temperature T. Each of these functions obeys Arrhenius's law; hence, $$\tau_1 (T) = \tau_{01} \exp (W1/kT)$$

$$\tau_2(T) = \tau_{02} \exp(W2/kT)$$

where k is Boltzmann's constant, W1 and W2 are called activation energies, and $\tau_{01}$ and $\tau_{02}$ are time constants.

If $\tau_1(T)$ and $\tau_2(T)$ are measured at different temperatures, then $\tau_{01}$ and $\tau_{02}$, and W1 and W2, can be determined, and on that basis the value of $\tau_1(T)$ and $\tau_2(T)$ for any arbitrary temperature can be determined.

The aforementioned patent application described a medium analogous to the medium MEMOI shown in FIG. 1 and found that aging at ambient temperature could be overcome relatively satisfactorily with a magnetooptical medium of this type, the dielectric layer DIELI$_2$ which was made of alumina.

The alumina layer is deposited, for example by vacuum deposition, by means of an electron gun at ambient temperature, in the same manner as the substrate SUBSI, the layer REFLECTI, the first dielectric layer DIELI$_1$ and the magnetooptic layer CMI, immediately after the application of this last layer. One such means of obtaining the alumina layer and the medium MEMOI is described, for example, in the article by M. Urner-Wille, IEEE Transactions on Magnetics, MAG - 17 (b) 3214 (1981).

The medium MEMOI can also be deposited by radio-frequency cathodic sputtering, at ambient temperature, as described in the thesis by Dominique Jeanniot entitled "Preparation et caracterisation de couches minces anisotropes de CoCr et de a—Fe Tb Gd pour enregistrement magnetique perpendiculaire" ("Preparation and characterisation of thin anisotropic layers of thin anisotropic layers of CoCr and of a—Fe Tb Gd for perpendicular magnetic recording", defended on Nov. 21, 1983 and presented to the Pierre et Marie Curie University, Paris 6, France. pages 137–151 and bibliography pages 130 and 131 are incorporated herein by reference.

However, although the resistance to aging of such a magnetooptical recording medium having its dielectric layer DIELI$_2$ made of alumina is satisfactory for temperatures on the order of ambient temperature (27° C.), it decreases considerably as the temperature rises.

Thus for the sample 4 obtained by one of the two aforementioned methods (see Appendix A attached hereto), it was possible to calculate that if the quantity $\tau_2(27°\text{ C.})$ was equal to 2350 years, then the quantity $\tau_2(70°\text{ C.})$ is reduced to 11.4 years, and $\tau^2$ drops to 3.7 days.

The applicant has unexpectedly discovered that by performing an annealing of the medium MEMOI shown in FIG. 1, at a temperature of 200° C. in a vacuum immediately after the deposition thereof (in the same vacuum container), the resistance to aging of the recording medium MEMOI was reinforced considerably, as will be apparent from a study of the table shown in the Appendix A. Thus, for sample 3, which underwent such an annealing for one-half hour, the value $\tau_2(27°\text{ C.})$ is 6800 years, or about 3 times greater than the value $\tau_2(27°\text{ C.})$ for sample 4. Samples 1, 2, 3 and 4 have the same constitution, but have undergone annealing at 200° C. for different durations: Sample 4 did not undergo any annealing, while sample 3 was annealed for 30 minutes, and samples 1 and 2 were each annealed for one hour and 30 minutes.

For sample 3, the value $\tau_2(70°\text{ C.})$ is 37 years; once again, this is greater by a factor of more than three than the value $\tau_2(70°\text{ C.})$ for sample 4, while $\tau_2(150°\text{ C.})$ for sample 3 is 14 days, or about three times greater than $\tau_2(150°\text{ C.})$ for sample 4.

Looking at Sample 2, it can again be observed that the characteristic times $\tau_2(27°\text{ C.})$, $\tau_2(70°\text{ C.})$, $\tau_2(150°\text{ C.})$ remain greater than the corresponding characteristic times for sample 4. Similar observations can be made for sample 1, especially for the characteristic times $\tau_2(70°\text{ C.})$ and $\tau_2(150°\text{ C.})$.

It can be seen that the most favorable annealing time is 30 minutes, since this enables obtaining characteristic times $\tau_2$ for sample 3 which remain satisfactory, even for very high operating temperatures.

Findings similar to those above can be made considering the values $\tau_1(27°\text{ C.})$, $\tau_1(70°\text{ C.})$ and $\tau_1(150°\text{ C.})$ for each of the samples 1, 2 and 3. The values of T1 remain satisfactory. In fact, considering that the duration for writing a datum using the thermo-magnetic mode is 60 nanoseconds, and that a writing operation is performed at the same point on a disk every 16 milliseconds (the revolution time, corresponding to one revolution of the disk), which is the least favorable case, it will be appreciated that writing can be performed a considerable number of times before the total writing time equals $\tau_1$. This provides an adequately long operational life for each disk.

It is thus seen that annealing at a temperature on the order of 200° C. for a period on the order of 30 minutes, up to one and one-half hours, makes possible a considerable improvement in the resistance to aging of magnetooptical recording media such as the medium MEMOI, where the dielectric layer DIELI$_2$ is of alumina. This makes it possible to use such media up to very high operating temperatures.

| | APPENDIX | | | |
|---|---|---|---|---|
| SAMPLE | 1 | 2 | 3 | 4 |
| ANNEALING DURATION AT 200° C. | 1H30 | 1H30 | 30' | 0 |
| W1 ev | 0.98 | 1.16 | 1.16 | not measurable |
| W2 ev | 1.058 | 1.064 | 1.076 | 1.1 |
| $\tau_{01}$ (hours) | 6.3 $10^{-11}$ | 3.4 $10^{-13}$ | 3.4 $10^{-13}$ | not calculated |
| $\tau_{02}$ (hours) | 3.48 $10^{-11}$ | 4.06 $10^{-11}$ | 5.2 $10^{-11}$ | 7.1 $10^{-12}$ |
| $\tau_1$ (27° C.) years | 202 | 1144 | 1144 | not measurable |
| $\tau_2$ (27° C.) years | 2270 | 3340 | 6800 | 2350 |
| $\tau_1$ (70° C.) years | 1.7 | 4.15 | 4.15 | not measurable |
| $\tau_2$ (70° C.) years | 13.5 | 19.2 | 37 | 11.4 |
| $\tau_1$ (150° C.) hours | 29 | 22 | 22 | not measurable |
| $\tau_2$ (150° C.) days | 5.7 | 7.8 | 14 | 3.7 |

N.B: For sample 4, the values of 1 are not measurable; there is practically no stage C$_1$ (see FIG. 3).

What is claimed is:

1. A method for overcoming aging of a magnetooptical recording medium (MEMOI) including a substrate (SUBSI), a light-reflective layer (REFLECTI), a first dielectric layer (DIELI$_1$), one magnetic layer (CMI) formed by an alloy including a metal of the group of rare earths and a metal of the group of the first transition series, and a second dielectric layer (DIELI) of alumina comprising the steps of fabricating the magnetooptical recording medium (MEMOI) by depositing successively in a vacuum at ambient temperature, the light-reflective layer on the substrate, the first dielectric layer on the light-reflective layer, the magnetic layer on the first dielectric layer and the second dielectric layer on the magnetic layer and thereafter annealing the magnetooptical recording medium (MEMOI) thus obtained at a temperature of approximately 200° so as to improve the resistance to magnetic aging of the magnetooptical recording medium.

2. A method for overcoming aging of a magnetooptical recording medium (MEMOI) including a substrate (SUBSI), a light-reflective layer (REFLECTI), a first dielectric layer (DIELI$_1$), one magnetic layer (CMI) formed by an alloy including a metal of the group of rare earths and a metal of the group of the first transition series, and a second dielectric layer (DIELI$_2$) of alumina comprising the steps of fabricating the magnetooptical recording medium (MEMOI) by depositing successively in a vacuum at ambient temperature, the light-reflective layer on the substrate, the first dielectric layer on the light-reflective layer, the magnetic layer on the first dielectric layer and the second dielectric layer on the magnetic layer, and thereafter improving the resistance to magnetic aging of the magnetooptical recording medium thus obtained by annealing the magnetooptical recording medium, the annealing being performed in a vacuum at a temperature of approximately 200° immediately after the fabricating steps for said magnetooptical recording medium have been completed, and wherein the duration of the annealing is at least substantially equal to one-half hour.

* * * * *

UNITED STATES PATENT AND TRADEMARK OFFICE
CERTIFICATE OF CORRECTION

PATENT NO. : 4,868,010

DATED : September 19, 1989

INVENTOR(S) : ROZE et al

It is certified that error appears in the above-identified patent and that said Letters Patent is hereby corrected as shown below:

In Col. 6, Claim 1, line 66 "(DIELI)" should be -- $(DIELI_2)$ --.

Signed and Sealed this

First Day of January, 1991

Attest:

HARRY F. MANBECK, JR.

Attesting Officer      Commissioner of Patents and Trademarks